Patented Apr. 25, 1933

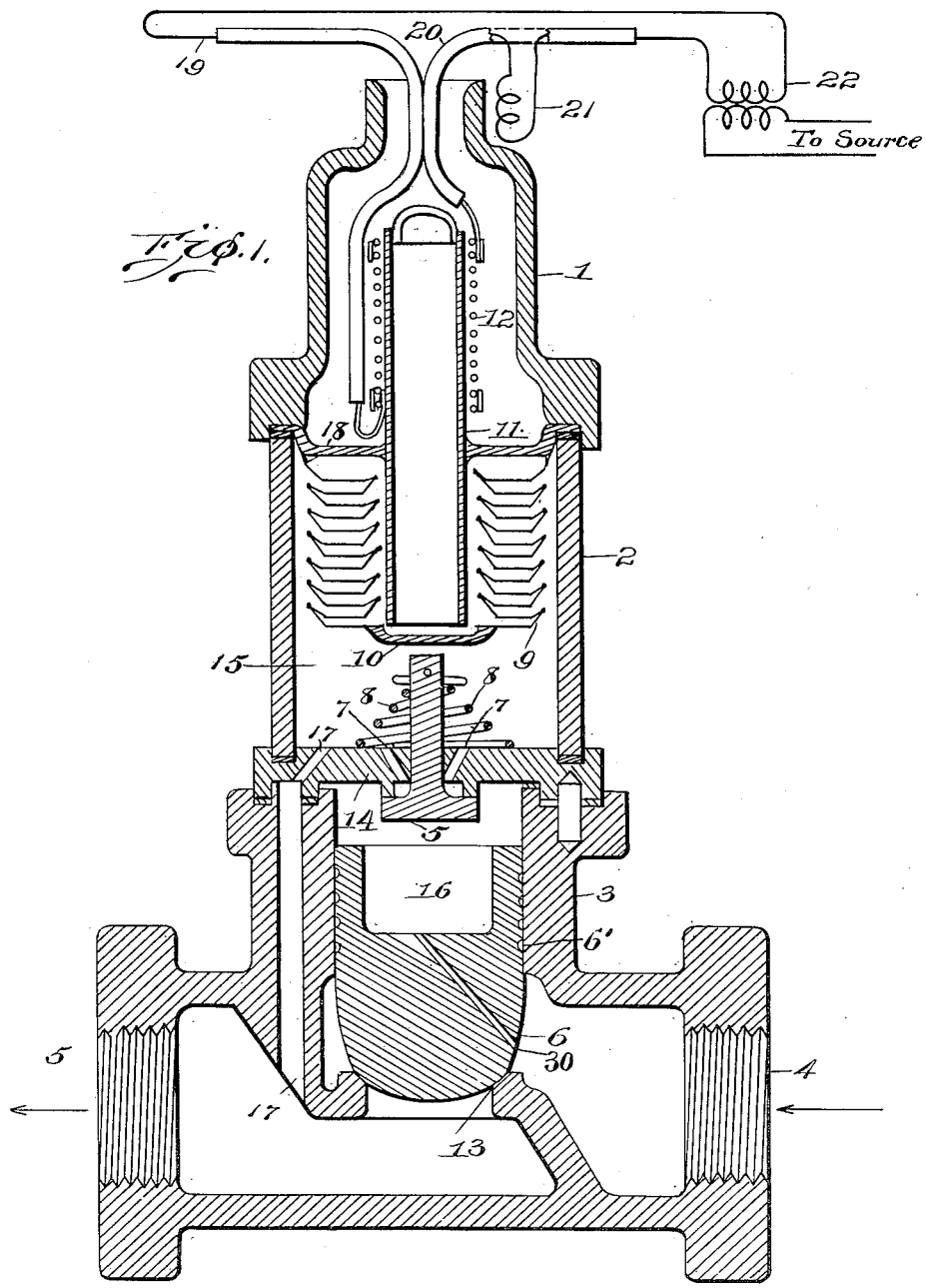

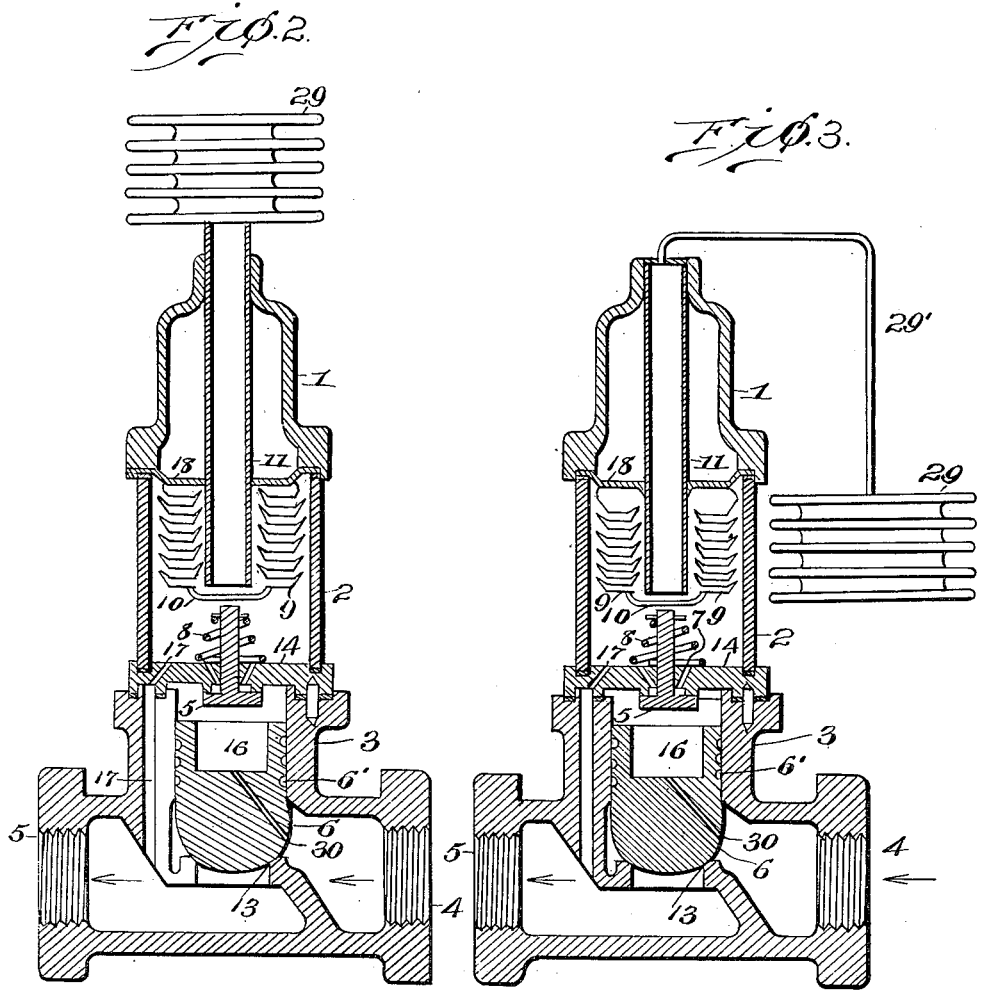

1,905,683

UNITED STATES PATENT OFFICE

THOMAS W. CARRAWAY, OF CHICAGO, ILLINOIS, ASSIGNOR TO GENERAL FIRE EXTINGUISHER COMPANY, OF PROVIDENCE, RHODE ISLAND, A CORPORATION OF DELAWARE

THERMOSTATICALLY CONTROLLED VALVE

Application filed November 27, 1928. Serial No. 322,241.

This invention relates in general to valves and actuating means therefor, which means, if desired, may be thermostatically controlled.

The principal feature of the invention resides in the provision of a main valve operable in either a low or high pressure line for controlling the passage of fluid therethrough, which main valve is opened or closed by pressure being exerted thereon controlled by a pilot valve, the pilot valve, in turn being controlled by means sealed within the casing and having no movable part extending therethrough, whereby the valve is "packless", thereby eliminating any danger of leakage while at the same time permitting control from external means of the main valve.

By means of this arrangement, and the employment of the pilot valve, a high pressure line may be controlled by the main valve through externally actuated means with very little or a minimum of force, the packless feature insuring the valve against leakage, which is particularly important in controlling obnoxious gases or wherein the valve is inaccessibly positioned.

The invention consists in the combination of parts and in the details of construction hereinafter set forth, certain embodiments being disclosed in the accompanying drawings, in which:

Fig. 1 is a view in vertical section of one form of the invention.

Fig. 2 is a similar view showing a modified form of the actuation means.

Fig. 3 is similar to Fig. 1 with the actuation means arranged remotely with respect to the valve.

Referring to the drawings Fig. 1 shows one embodiment in which the valve casing is formed in three sections 1, 2, and 3. In section 3 is located the main valve 6 which is mounted slidably within the casing and arranged to seat upon the valve seat 13 under gravity. The valve 6 is also provided with peripheral grooves 6' to guard against leakage. The valve 6, as will be noted, regulates the passageway from the inlet 4 to the outlet 5', and is ported at 30 from the interior to the inlet 4.

A partition 14 between the sections 2 and 3 of the casing is ported at 7 and is provided with a controlling or pilot valve 5 held normally closed by the action of the compression spring 8. The chamber 15 which is within the section 2 is provided with a communicating passageway 17 to the casing outlet.

A partition 18, separating section 1 from section leading 2 of the casing, has centrally disposed therein a cylindrical container 11 sealed at the top and open at the bottom, and extending through the major portion of sections 1 and 2. A bellows 9 is also attached to the partition 18 and to a rigid member 10 so as to enclose the open end of the container 11. The container and bellows are filled with a volatile fluid such as alcohol.

An electrical heating unit, for heating the alcohol, consists in suitable means including resistance wires 12 encircling the container. Upon the heating of these resistance wires, the alcohol becomes volatile and, in expending, expands the bellows 9, forcing the member 10 to push the secondary valve 5 downwardly open and opening the port 7.

Upon the opening of the port 7 a suction is created which lifts the main valve 6 off of its seat and allows the passage of liquid gas, steam or air from the inlet 4 to the outlet 5'. Obviously the return of the alcohol to the original temperature causes a retraction of the bellows, the closing of the secondary valve 5, and the main valve 6.

The two lead wires 19 and 20 from the resistances wires are connected in circuit with a suitable thermostatic control 21 and transformer 22 or directly with a current supply source.

Another form of the invention is shown in Fig. 2 in which the device is identical with the exception that the means for heating the liquid in the container 11 is dispensed with and an external reservoir 29 is employed. Variance in temperature causes the liquid in the reservoir 29 to expand or contract and by reason of the communication of said reservoir with said container 11 and bellows 9 the valve action is the same as described in connection with Fig. 1.

Fig. 3 merely shows the adaptability for remote control and in this case the reservoir 29 is shown in a remote position with a pipe 29' forming the means of communication with the container 11 and bellows 9.

I claim:

A valve mechanism comprising, in combination, a housing having an inlet and an outlet passage with a valve seat therebetween; a main valve arranged to be seated on said seat to prevent direct flow from the inlet to the outlet passage; a second housing mounted on the first housing with a partition therebetween forming a chamber in the first housing on the side of said valve opposite its seat; a passage through said valve connecting the said chamber with the inlet passage whereby the supply pressure is admitted to said chamber to hold the valve seated; a third housing mounted on said second housing having a partition therebetween comprising a tubular container extending on both sides of the last said partition into the chambers of the second and third housings respectively; the portion of said container located in the chamber of the third housing having its end closed and the portion of said container located in the chamber of the second housing having its end open; a bellows sealed within the chamber of the second housing in communication with the open end of said container; a port in the first said partition connecting the chamber above the main valve in the first housing with the chamber of the second housing; an auxiliary valve located in the chamber of the first housing above the main valve having a stem extending through the first said partition into the chamber of the second housing in position to be engaged by said bellows; a spring acting on said stem to hold said auxiliary valve seated whereby the said port is closed; a second port in the first said partition opening into a passageway through the first housing leading to the outlet passage thereof; an electric heating coil surrounding the portion of the container extending into the chamber of the third housing having conduits leading to a source of electric current; and a fluid in said container and bellows adapted to expand when an electric current is passed through said heating coil; the expansion of said fluid causing said bellows to move into engagement with the stem of the auxiliary valve and effect the latter's opening, thereby permitting the pressure acting on the main valve to seat it to pass through the port opened by the auxiliary valve and thence escape through the other port in the first said partition and associated passageway to the outlet passage of the first housing, whereby the inlet pressure acting on the main valve effects its opening.

In testimony whereof I affix my signature.

THOMAS W. CARRAWAY.